United States Patent
Yamashita et al.

[11] 3,828,213
[45] Aug. 6, 1974

[54] STATOR FOR LOW-INERTIA DC MACHINES

[75] Inventors: Seizi Yamashita; Kazuo Onishi, both of Ibaraki, Japan

[73] Assignee: Hitachi, Ltd., Tokyo, Japan

[22] Filed: May 23, 1973

[21] Appl. No.: 362,966

[30] Foreign Application Priority Data
June 5, 1972 Japan.............................. 47-55038
Aug. 30, 1972 Japan.............................. 47-86218

[52] U.S. Cl.................. 310/254, 310/154, 310/152
[51] Int. Cl. ........................................... H02k 1/06
[58] Field of Search .......... 310/154, 254, 256, 258, 310/152, 181, 191, 193, 259

[56] References Cited
UNITED STATES PATENTS

| | | | |
|---|---|---|---|
| 29,850 | 9/1860 | Baker................................ | 310/154 |
| 422,999 | 3/1890 | Thomson........................... | 310/254 |
| 1,044,827 | 11/1912 | Smith................................. | 310/190 |
| 1,950,987 | 3/1934 | Kongsted.......................... | 310/154 |
| 2,610,993 | 9/1952 | Stark................................. | 310/191 |
| 2,898,486 | 8/1959 | Sheldon............................ | 310/191 |
| 2,968,755 | 1/1961 | Baermann......................... | 310/181 |
| 3,296,471 | 1/1967 | Cochardt.......................... | 310/181 |

*Primary Examiner*—J. D. Miller
*Assistant Examiner*—Patrick Salce
*Attorney, Agent, or Firm*—Pollock, Philpitt & Vande Sande

[57] ABSTRACT

This invention relates to a stator which forms the magnetic circuit of a DC machine, and provides a stator for a low inertia motor particularly adapted for the capstan driving of computors, in which the cross-sectional area of magnets is increased, whereby the interpole leakage flux is minimized and the effective flux density between the poles and the armature is increased and further the flux density is made largest at the contacting surface with the pole.

3 Claims, 13 Drawing Figures

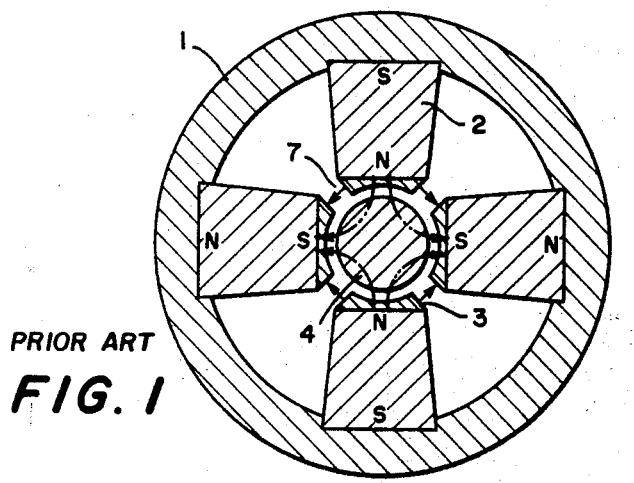
PRIOR ART
FIG. 1
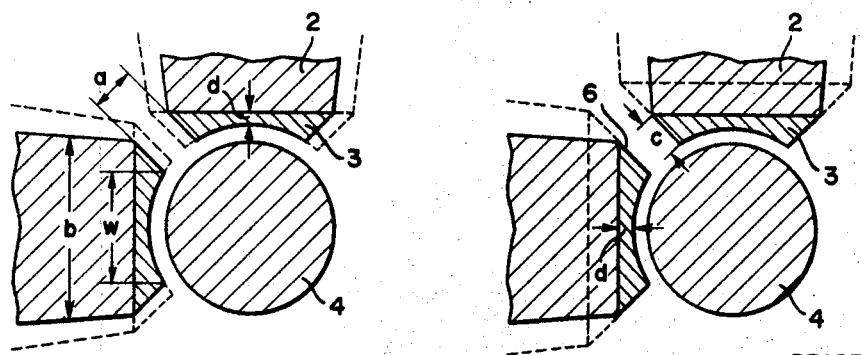
PRIOR ART FIG. 2a
PRIOR ART FIG. 2b
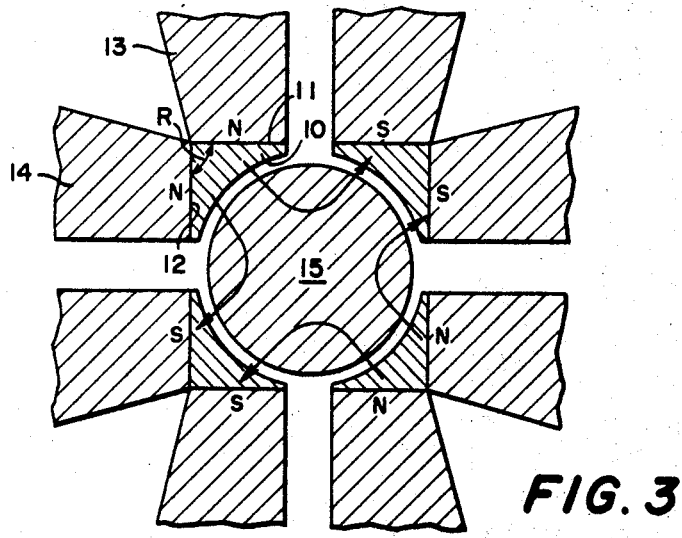
FIG. 3

STATOR FOR LOW-INERTIA DC MACHINES

This invention relates to the construction of a stator which forms the magnetic circuit of a DC machine. More particularly, the invention contemplates the provision of a stator adapted for use in a low inertia motor which is used as the capstan motor of the magnetic tape system of electronic computors.

Recently, the demand for increasing the speeds of the motors used in this type of machine and equipment is increasing, and to meet this demand the rotor of the motor is required to have a lower inertia so as to reduce the time required from the start to the rated speed operation of the motor, the time required from the interruption of current supply to the stoppage of the motor and the time of normal operation of the motor between acceleration and deceleration thereof, and is also required to enable the motor to generate a torque at least twice that of conventional motors.

For instance, in order that a motor shall operate at a feed rate of 300 inches per second, with the same armature as used in a capstan motor operable at a feed rate of 200 inches per second, the torque of the motor is required to be about 2.25 times that of the latter motor because the starting and stopping times of the former motor requires 1/1.5 times and the normal operation speed thereof requires 1.5 times that of the latter motor.

The acceleration of the motor may be achieved by increasing the torque of the motor by increasing the flux passing the armature or by increasing the current passing in the armature winding or by reducing the moment of inertia of the motor. However, it is after all necessary to decrease the ratio of the moment of inertia to the product of the current passing in the armature winding and the effective flux passing the armature by about 2.25 times.

However, the moment of inertia of the aforesaid capstan motor cannot arbitrarily be reduced as the shape and strength of the motor are subjected to limitations in the relation between the armature of the motor and the load imposed on said motor.

Further, increasing the armature current increases the problem of heat generation. To suppress the generation of heat, the wire diameter of the armature winding must be made large and this results in an increased diameter of the armature as a whole and an increased moment of inertia. On the other hand, when the armature current is increased without changing the wire diameter of the armature winding, the heat generated increases in proportion to the square of the current value, making the cooling of the motor by the normal cooling method difficult.

In view of the foregoing, it would be most effective, for increasing the torque of the motor, to increase the flux which has relatively less influence on the other elements.

In a conventional motor of this type, magnets arranged radially in equally spaced relation are fixed within a housing serving simultaneously as a magnet holding frame and a pole shoe piece is provided at the inner end of each magnet with a slight gap between it and the peripheral surface of a rotor.

This type of motor includes several types and the construction of the armature used varies depending upon the type of motor. Namely, in a cylindrical or cup-type armature motor, a rotor composed of the armature winding is rotatably disposed between a center core and poles in which the outer core is not rotatable per se, and in a smooth core armature motor the armature windings are arranged on the surface of the core which is rotatable per se.

As a method of increasing the flux, it is conceivable first to make the armature diameter large to expand the magnetic path of flux as stated previously. This method, however, not only increases the size of the entire motor but also produces an adverse effect as the moment of inertia increases in proportion to the third power of the armature diameter.

In short, a method is preferable which enables the armature to be provided in such a shape which minimizes the moment of inertia and yet makes the amount of flux as large as possible.

In this view, there has been employed a method of increasing the flux by improving the material of magnets. Namely, Alnico magnets have been developed and are presently being used which are capable of generating a flux of about 13,000 gausses. This flux value, however, is the critical upper limit and the magnets in practice are being used at a flux value of 11,000–12,000 gausses. For obtaining a torque more than twice of that of the motor comprising such magnets, from a motor of substantially the same size, a flux of at least 15,000–16,000 gausses would be necessary which cannot be expected from the presently used Alnico magnets at all in view of the capacities of said magnets.

It is also considered to increase the cross-sectional area of the magnets or to increase the thickness of the poles. However, the former method results in a decrease of the gap between the poles, while the latter method results in an increase of the confronting surface area of each pole, and thus the leakage flux increases in either method. Consequently, increasing the cross-sectional area of the magnets will have no significance.

For minimizing the leakage of flux, it may be considered to increase the gap between the poles or to decrease the confronting surface area of each pole. Such methods, however, inevitably result in a reduction of the cross-sectional area of the magnets and are undesirable.

As described, according to the construction of the conventional motor, increasing the cross-sectional area of the magnets results in an increase of the leakage flux, whereas the effort of decreasing the leakage flux results in a reduction of the cross-sectional area of the magnets, and thus it has been impossible to improve the performance of the motor in more than a certain degree by either method.

A stator in which the back side of each pole piece has two surfaces inclined relative to each other at an angle smaller than 180 degrees and a ferrite magnet plate having a high coercive force is attached to each one of said two surfaces, has already been known as disclosed in U.S. Pat. No. 3,296,471. This stator is effective for decreasing the leakage flux and increasing the flux density in an air gap between the pole piece and the armature.

In the present invention, the stator is so constructed that the back side of each pole piece is formed of two surfaces inclined relative to each other at an angle of substantially 90 degrees and a magnet is attached to each of said surfaces which is magnetized in the radial direction and has such high flux density that the residual flux density is at least larger than 8,000 gausses, such as Alnico 5 magnet, and which is formed in such a cross-sectional shape that the effective length in the radial direction thereof is considerably longer than the width of the magnet. In the stator of the invention, the magnets are attached to the respective pole pieces such that the magnets attached to the same pole piece have the same polarity but have opposite polarity to those attached to the pole piece of the adjacent pole. Further, in the stator of the invention each of the magnets attached to each pole piece is so shaped that the inner end face of the magnet to be in contact with said pole piece is smaller in width than the outer end face thereof.

By increasing the effective length of the magnet as stated, the amount of flux is increased as the magnetomotive force of the magnet increases in proportion to the effective length thereof. The amount of flux is further increased by forming the back side of the pole piece of the two surfaces inclined relative to each other at an angle of substantially 90 degrees, since the magnet can be provided on each of such surfaces.

It is possible by forming the poles as described above, to make the confronting surface area of the adjacent poles very small and to reduce the leakage flux accordingly. In the present invention, however, the magnets provided on adjacent poles have the opposite polarities to each other and a slight flux leakage occurs at the confronting surfaces of these adjacent magnets. The width of the outer end portion of the magnets is made larger as stated, for the purpose of compensating for such flux leakage. The leakage flux is relatively small at a portion close to the pole piece since the permeances in the gaps between the poles and the armature are larger than the permeance in the gap between the confronting magnets. It is for this reason that the cross-section of each magnet is made progressively wider from the inner end to the outer end thereof in all of the embodiments given herein.

The magnet having a width smaller at the inner end face than at the outer end face thereof has the advantage described above, but on the other hand, has the disadvantage that the flux density is saturated at a point one third from the inner end face of the magnet in contact with the pole piece and the maximum flux density cannot be obtained at the surface in contact with the pole. In order to eliminate such disadvantage, in one embodiment of the invention the thickness of the magnets is gradually reduced from the end closer to the yoke (the outer end) toward the end closer to the pole piece (the inner end) and abruptly reduced near the inner end, so that the flux is supplied to the pole piece at the maximum flux density.

The object of the present invention is to provide a stator for a low inertia motor, in which the cross-sectional area of the magnets is increased in view of the above to minimize the leakage flux between the adjacent pole pieces and thereby to make the flux density between the pole pieces and armature extremely large.

Another object of the present invention is to provide a stator for a low inertia motor, in which the magnetic flux density and the magnetic field intensity in the magnet are most increased at the end portion contacting with the back side surface.

One feature of the present invention is that a stator for low-inertia DC machine has a magnet pole piece of which the back side is formed of an orthogonal isosceles shape.

Another feature of the present invention is that a stator for low-inertia DC machine comprises magnetic pole pieces, each having the back side formed by two surface inclined relative to each other at an angle of substantially 90 degrees and elongated magnets respectively secured to the two back side surface of said respective magnetic pole pieces at the longitudinal ends thereof in such manner that the two magnets secured to the same magnetic pole piece have the same polarity on the same side and the adjacent magnets secured to the adjacent magnetic pole pieces have the opposite polarities on the same side, each of said magnets being in such shape that the thickness thereof in the circumferential direction of the stator is gradually reduced from one end toward the other end in contact with the magnetic pole piece and the degree of thickness reduction is greater at the portion in the close proximity of the end in contact with the magnetic pole piece.

Another feature of the present invention is that a stator for low-inertia DC machine has magnets, wherein the thickness of each magnet changes linearly to form at least two flat surfaces.

Other features of the invention will become apparent from the following detailed description with reference to the embodiments shown in the accompanying drawings.

FIG. 1 is a sectional view showing a prior art DC machine;

FIGS. 2a and 2b respectively are enlarged sectional views showing a portion of the DC machine shown in FIG. 1;

FIG. 3 is a sectional view showing fragmentarily a stator of DC machines according to the invention;

Figure 4:
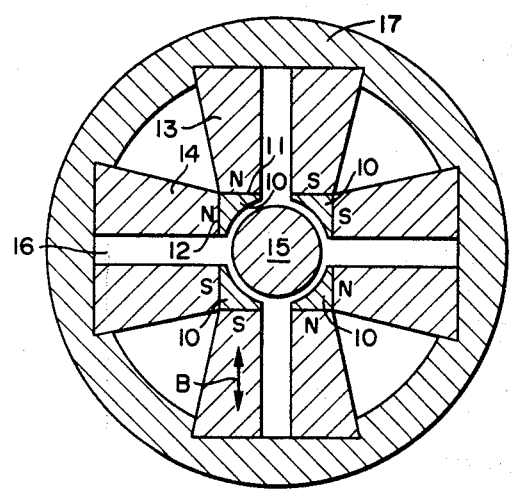
FIG. 4 is a sectional view showing the stator of FIG. 3 as mounted on a supporting yoke.

Before describing the present invention, the prior art stator for DC machines stated previously will be described first with reference to FIGS. 1, 2a and 2b to facilitate the understanding of the present invention. In FIG. 1, four magnets 2 are fixed in the interior of a supporting yoke 1 in circumferentially equally spaced relation. Each magnet 2 has secured to the inner end face thereof a magnetic pole piece 3 having an arcuate end face. A rotor or armature 4 is rotatably disposed in the cylindrical space defined by these magnetic poles.

In the prior art DC machine shown in FIG. 2, it is known to increase the cross-sectional area of the magnets for increasing the quantity of magnetic flux without increasing the diameter of the armature 4. If the width w of the end face of the magnetic pole piece is increased, as indicated by the dotted line in FIG. 2a, to increase the cross-sectional area of the magnet, the distance a between the adjacent magnetic pole pieces will decrease and the leakage flux indicated by the arrows 7 in FIG. 1 will increase. Therefore, the effect of the increased cross-sectional area will be offset by the increase of leakage flux and thus, increasing the cross-sectional area does not constitute a proper solution for increasing the flux. On the other hand, if the thickness d of the magnetic pole pieces is increased, as shown in FIG. 2b, to increase the quantity of magnetic flux, the length c of the magnetic pole pieces will increase, so that the area of the confronting surfaces 6 of the respective magnetic poles will increase and an increased leakage flux will result. Thus, increasing the magnetic pole piece width does not provide an acceptable solution for increasing the magnetic flux. According to the present invention, it is possible to increase the effective magnetic flux without increasing the leakage flux, in the manner which will be described hereunder with reference to the drawings.

The armature 15 in the embodiments of the invention includes various types having a winding and a central core. As shown in FIG. 3, the back or outer side of each magnetic pole piece 10 is formed of first and second flat surfaces 11 and 12 arranged at an angle of 90° relative to each other, and first and second permanent magnets 13 and 14 are attached to said surfaces 11 and 12 respectively. The magnets 13 and 14 respectively are made of a material having a high flux density, such as Alnico 5, and are of such shape that their effectively length is larger than the width in the radial direction of the motor.

Since the magnets 13 and 14 are made of a high flux density material, an increase of the magnetic flux can be obtained in proportion to the increase of the effective length. In the embodiment shown in FIG. 3, the magnets are formed in an elongate shape so that a greater amount of magnetic flux may be supplied to the armature 15, and further the back side surfaces 11 and 12 of each magnetic pole piece 10 are arranged at an angle at an angle of 90°, and each has one magnet attached thereto. Therefore, one magnetic pole piece 10 is magnetized by the two magnets 13 and 14, whereby the quantity of magnetic flux supplied from one magnetic pole piece to the armature is increased and consequently the magnetic flux density between the magnetic pole pieces and the armature is increased considerably.

It was revealed through experiment that, with the construction of the invention described above, it is possible to increase the magnetic flux density between the magnetic pole pieces and armature so that actually the magnetic flux density can be increased to more than 16,000 gausses to produce a super-high torque motor.

FIG. 4 shows the most preferred embodiment of the stator according to the invention, in which the magnetic assembly shown in FIG. 3 is applied to a four-pole machine. Therefore, the four magnetic pole pieces 10 each having orthogonal isosceles surfaces on the back side are arranged symmetrically just in a manner to form the four corners of a square shape.

The two magnets connected to the back side surfaces of each magnetic pole piece 10 are arranged with the same polarity on the same side. One of the magnets is opposed by the closer one of the magnets connected to the adjacent magnetic pole piece, with a predetermined gap formed between them in the peripheral direction of the motor, and is secured to a yoke or stator frame 17 at the outer end thereof. The adjacent magnets are arranged such that the polarities thereof on the same side are opposite to each other, so as positively to form a magnetic path through the yoke 17 and the armature 15.

The magnets have such a shape that the width thereof increases on the homopolarity side in the radial direction of the motor or in the longitudinal direction of the magnets toward the outer ends thereof, so as to compensate the leakage flux on the heteropolarity side of the magnets which is spaced apart from the adjacent magnet by a gap 16 of a predetermined width.

Further, the anisotropy B of each magnet acts in a direction at right angles to the surface of the magnet in contact with the corresponding magnetic pole pieces, and the surface of the magnetic pole piece facing the armature extends over the contacting end faces of the two magnets connected to said magnetic pole piece.

In the motor shown in FIG. 4, the gap between the exposed surface of one magnetic pole piece and the armature can be made much smaller than the gap formed between said magnetic pole piece and the adjacent magnetic pole piece, so that the magnetic flux supplied by the two magnets substantially entirely passes said exposed surface of the magnetic pole piece toward the armature 15 by being directed by said magnetic pole piece and forms the aforesaid closed magnetic path.

Figure 5:
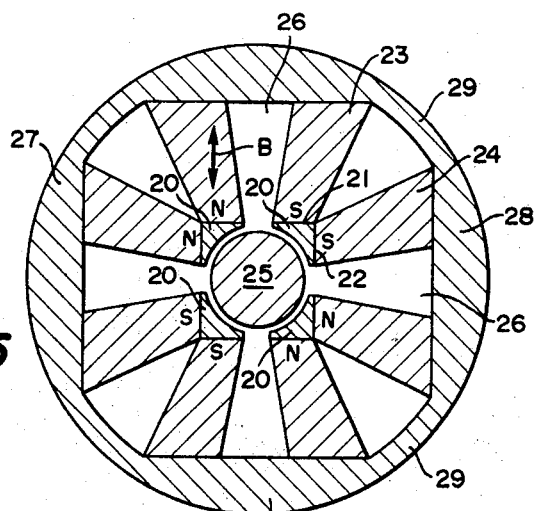
FIG. 5 is a sectional view showing another embodiment of the stator according to the invention.

In the embodiment shown in FIG. 5, each magnetic pole piece 20 has first and second flat surfaces 21 and 22 forming an orthogonal surface, similar to the magnetic pole piece shown in FIG. 4, and two elongated first and second flat surfaces 23 and 24 are respectively connected to said surfaces 22 and 23 at one ends, with the other ends secured to the inner surface of an annular magnetic yoke or stator frame 27. An armature or rotor 25 is disposed in the cylindrical space defined by the magnetic pole pieces 20.

In this embodiment, the gap 26 formed between the adjacent magnets of heteropolarity connected to the adjacent magnetic pole pieces expands in the radial direction of the motor toward the outer ends of said magnets, so that the leakage flux between the magnets is decreased. Further, the yoke 27 is increased in thickness at each portion 28 where the adjacent magnets of heteropolarity are secured to said yoke, and is decreased in thickness at each portion 29 where the adjacent magnets of homopolarity are secured to said yoke. Since the larger width portions 28 readily pass the magnetic flux, the magnetic path is formed positively. In this embodiment, the anisotropy B of each magnet acts also in a direction at right angles to the face of the magnet in contact with the magnetic pole piece.

Figure 6:
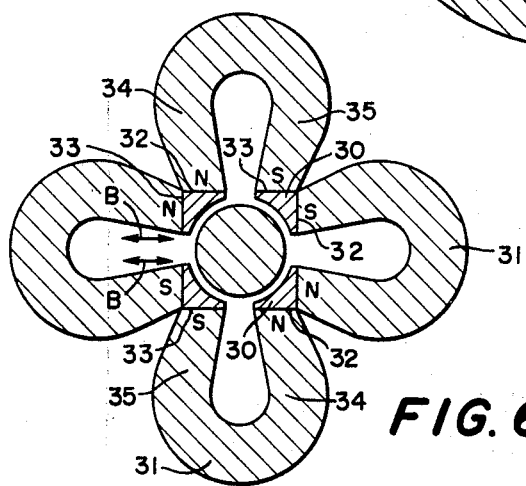
FIGS. 6 and 7 are sectional views respectively showing other embodiments of the invention.

Still another embodiment of the invention is shown in FIG. 6, with a magnetic yoke omitted. In this embodiment, each magnetic pole piece 30 also has orthogonal surface consisting of first and second flat surfaces 32 and 33 on the back side thereof, and a horse shoe type permanent magnet 31 of heteropolarity is connected at their ends to the adjacent back side surfaces of the adjacent magnetic pole pieces in such a manner that the end surface of a first leg 34 of the horse shoe type permanent magnet 31 is secured to the first flat surface 32 of one pole piece 30 and the end surface of a second leg 35 is secured to the second flat surface 33 of the other pole piece adjacent to said one pole piece. The anisotropy B of each magnet is indicated by the arrow B.

Figure 7:
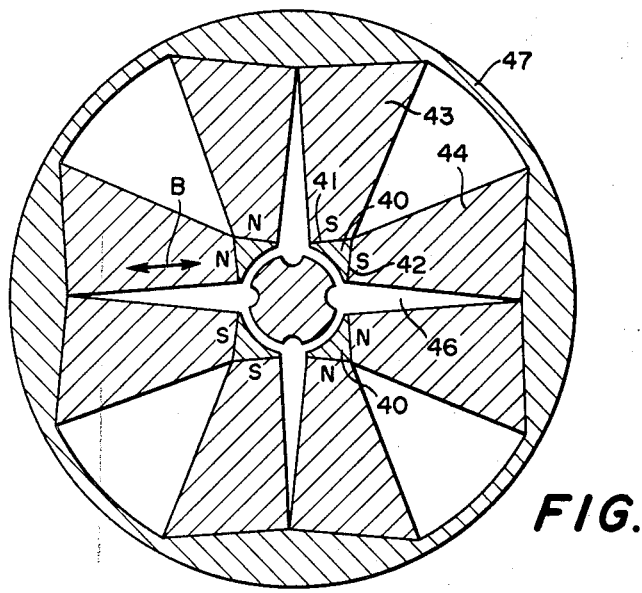

Still another embodiment of the invention is shown in FIG. 7, which is a modification of the embodiment shown in FIG. 5. In this embodiment, two surfaces 41 and 42 are provided on the back side of each magnetic pole piece 40 to form an acute angle relative to each other so that the back side area of the magnetic pole piece may be larger than that in each of the above-described embodiments, and magnets 43 and 44 are respectively connected to said two surfaces with the same polarity on the same side. The assembly is made in this embodiment also such that the anisotropy of each magnet may be in a direction at right angles to the surface 41 or 42 as indicated by the arrow B, and therefore, a gap 46 between the two adjacent magnets of heteropolarity becomes progressively narrower toward a yoke 47, with the result that the leakage flux between the adjacent magnets increases. In order to compensate the loss caused by the leakage of flux, the end of each magnet secured to the yoke 47 is made wider than that in each of the preceding embodiments. Namely, the construction of this embodiment is advantageously used in the event when a larger flux density is desired between the magnetic pole pieces and armature, although the efficiency of the magnets is poor.

In each embodiment described above, the magnets are shaped such that its circumferential width increases gradually linearly toward the outer ends thereof, so as to compensate the quantity of leakage flux and by shaping the magnets as such it is possible to increase considerably the effective magnetic flux as compared with that of the prior art. However, the magnets of such shape still have a shortcoming and the present invention also provides a magnet free of such shortcoming. In the embodiments described above the width of the magnets increases linearly, but in the embodiment to be described hereunder the width of magnets is changed curvedly so that the magnetic flux density may be maximum at the surface of contact between the magnet and magnetic pole piece.

Figure 8:
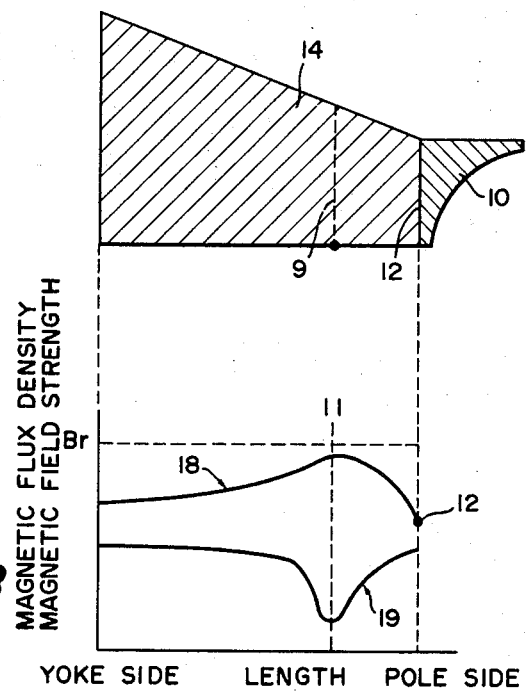
FIG. 8 is a diagram showing the flux density and the magnetic field intensity distribution of the magnet shown representatively in FIG. 3.

The magnetic piece (10, 20, 30 or 40) in the embodiments shown in FIGS. 3 to 5 and 7 has the shape shown in FIG. 8. Here, a discussion will be presented concerning the magnet 14 shown in FIG. 4. The magnetic flux density curve 18 and the magnetic field intensity curve 19 of the magnet 14 shown in FIG. 8 were obtained by plotting the actually measured values. As may be apparent from these curves 18 and 19, the maximum flux density lies in the position indicated by the dotted line 9, and the field intensity is minimum at the position indicated by this dotted line 9. Namely, the flux density is highest at a position of the magnet about one-third from the magnetic pole piece and decreases toward the opposite ends of the magnet or toward the yoke and the magnetic pole piece. On the contrary, the field intensity is lowest at the point where the flux density is highest, and increases toward the opposite ends of the magnet.

It has been found from the foregoing that it is preferable that the magnet flux of the magnet converges toward the magnetic pole piece and the magnetic flux density becomes highest at the end of the magnet in contact with the magnetic pole piece. Theoretically, the effective magnetic flux toward the gap between the magnetic pole piece and armature becomes largest when the magnet has the highest flux density at its surface in contact with the magnetic pole piece. In case of a magnet of the shape shown in FIG. 8, however, the magnetic flux density is saturated at a point of the magnet about one-third from the magnetic pole piece as stated above, and the magnetic flux decreases from this point toward the magnetic pole piece as well as the flux density.

In short, it is essential to shape the magnet such that the magnetic flux saturation point be eliminated and the magnetic flux density gradually increases toward the magnetic pole piece and becomes highest at its surface in contact with said magnetic pole piece.

Now, the ideal magnet shape will be determined theoretically based on the above point of view.

First of all, the full leakage flux of one of two heteropolarity magnets connected to a magnetic pole piece in side-by-side adjacent relation, with their anisotropy acting at right angles to said magnetic pole piece, will be determined hereinafter.

Figure 9:
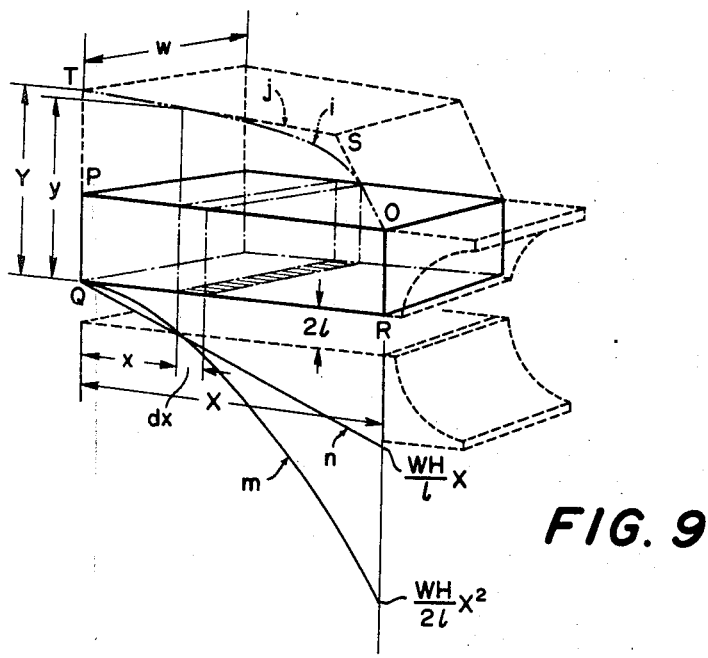
FIG. 9 is a diagram for analyzing the principle upon which one aspect of the invention is based.

The magnet having the anisotropy G thereof acting at right angles to the magnetic pole piece to which said magnet is secured, has a rectangular cross-section defined by the points O, P, Q, R in FIG. 9, which is elongate in the radial direction of the assembly.

Discussion will be made in terms of theoretical formulae with reference to FIG. 9. With X representing the length of the magnet in the radial direction of the assembly, $x$ representing the distance from the outer end of the magnet to an optionally selected point $x$ on said magnet, and Hx representing the field intensity at the point $x$, the full magnetomotive force $F(X)$ at the point $x$ is expressed by:

$$F(X) = \int_0^x Hx \cdot dx \quad (1)$$

Now, with $2l$ representing the distance between two magnets and W representing the depth of the magnets, the leakage flux $d\theta$ in a short length $dx$ is expressed by the product of the full magnetomotive force up to the point $x$ and the permeance, that is:

$$d\theta = F(X) \cdot (W \cdot dx/l) \quad (2)$$

(because the leakage flux is substantially entirely the leakage flux between the two magnets and the other leakage fluxes are negligibly small).

From formula (2), the leakage flux $\theta x$ for the unit length of magnet is determined as follows:

$$\phi x = \frac{d\phi}{dx} = F(X) \frac{W}{l} = \frac{W}{l} \cdot \int_0^x Hx \cdot dx \quad (3)$$

Supposing here that the field intensity H is constant at any point of the magnet, the leakage flux $\theta$ at the point $x$ is expressed by:

$$\theta = (W/l) \cdot H \cdot x \quad (4)$$

Therefore, the full leakage flux $\theta x$ up to the point $x$ can be obtained by integrating formula (4). Namely, $$\phi = \int_0^x \phi dx = \frac{W \cdot H}{l} \cdot \int_0^x x\,dx = \frac{W \cdot H}{2l} \cdot x^2 \quad (5)$$

For instance, the leakage flux when the distance $x$ is largest or at the point of contact between the magnet and the magnetic pole piece is expressed by:

$$(W \cdot H/2l) \cdot X^2$$

It will be understood that by plotting this value, a quadratic curve is obtained such as the curve m shown in FIG. 9. The amount of the leakage flux at each point is indicated by the curve n in FIG. 9.

Now that the shape of magnet which makes all the magnetic flux extend at right angles to the magnetic pole piece has been determined in the manner described above, a shape of magnet to compensate said leakage flux can be determined in the following manner:

With $\theta Mx$ representing the magnetic flux passing the cross-section of the magnet at the point $x$ or the magnetic flux of the magnet, the total magnetic flux $\theta T$ is expressed by the sum of the magnetic flux $\theta Mx$ of the magnet and the full leakage flux $\theta$ up to the point $x$, that is:

$$\theta Tx = \theta Mx + \theta x \quad (6)$$

Since the flow of magnetic flux is continuous, equation (6) is established at any and all points $x$. In other words, the total magnetic flux of this magnet is equal to the sum of the magnetic flux passing in the magnet and the leakage flux, which is constant at any portion of the magnet. Therefore, when considering the relation of equation (6), for example, at the radially outer end of the magnet, that is, the point of $x = 0$, the value of $\theta x$ is 0 from equation (5), so that:

$$\theta TO = \theta MO \quad (7)$$

Now, with $SMx$ representing the cross-sectional area of the magnet at the optional point $x$ and B representing the magnetic flux density, the magnetic flux $\theta Mx$ in the magnet is expressed by the following formula:

$$\theta Mx = B \cdot SMx \quad (8)$$

The cross sectional area $SMx$ of the magnet is expressed by the depth W and the thickness Y of the magnet. Therefore, with $y$ representing the magnet thickness at the point $x$, formula (7) can be substituted by:

$$\theta Mx = B \cdot W \cdot y \quad (9)$$

The thickness of the magnet can be determined based on the foregoing theoretical formulae, under the condition that the magnetic field intensity of the magnet is constant.

Namely, by incorporating formulae (5) and (9) in equation (6) it is stated that:

$$\theta Tx = B \cdot W \cdot y + (WH/2l)\, x^2 \quad (10)$$

Since the total magnetic flux $Tx$ is constant at any point $x$ as stated above, it is stated that:

$$\theta Tx = \theta To = \theta Mo$$

Therefore, equation (10) may be rewritten as follows:

$$\theta Tx = \theta To = \theta Mo = B \cdot W \cdot y + (W \cdot H/2l) \cdot x^2$$

From this equations, $$y = \frac{\phi Mo - \frac{W \cdot H}{2l} x^2}{BW}$$

or, in a more simplified form, $$y = \frac{\phi Mo}{BW} - \frac{\frac{W \cdot H}{2l} \cdot x^2}{BW} = \frac{\phi Mo}{BW} - \frac{H}{2lB} \cdot x^2 \quad (11)$$

Since $\theta Mo$ in the above equations is the magnetic flux in the magnet at $x = 0$, with $yo$ representing the magnet thickness at $x = 0$, it is stated that:

$$\theta Mo = B \cdot W \cdot yo$$

When this is incorporated in equations (11), $$y = (B \cdot W \cdot yo/BW) - (H/2lB) \cdot x^2 = yo - (H/2lB) \cdot x^2 \quad (12)$$

This equation shows that the magnet thickness at each point $x$ of the magnet is indicated by the value obtained by subtracting the value of $H \cdot x^2/2lB$ from the magnet thickness at the radially outer end of the magnet, i.e. the magnet thickness at the point $x = 0$.

The shape of magnet determined by this theoretical formula is such that one side edge of the magnet in a vertical cross-section through the diameter of the assembly is curved as indicated by the curved line i in FIG. 9. Namely, the thickness of the magnet gradually decreases from the outer end to the inner end in contact with the magnetic pole piece of the magnet over the length thereof and the proportion of the thickness decrease gradually becomes larger toward the magnetic pole piece, with the gradient of the upper surface of the magnet changing along a quadratic curve.

It is practically difficult, however, to make a magnet having such a curved surface. Therefore, in practice the magnet is fabricated in a shape close to the aforesaid curved line or to have the cross-sectional shape indicated by the straight lines $j$ in FIG. 9. Namely, the magnet is shaped to have a flat end surface on the side on which the leakage of flux occurs and at least two inclined surfaces on the opposite side, the angle of inclination of one of said two inclined surfaces on the opposite side, the angle of inclination of one of said two inclined surfaces closer to the magnetic pole piece being greater than the other one remote from said magnetic pole piece.

Figure 10:
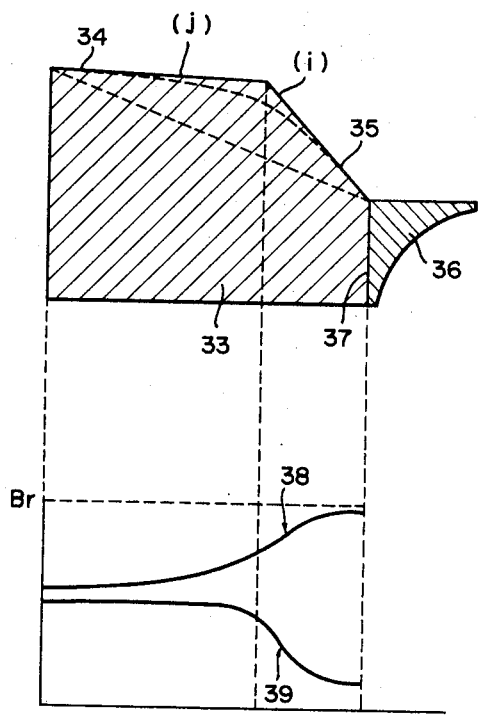
FIG. 10 is a diagram showing the flux density and the field intensity distribution of one form of magnet formed based upon the principle illustrated in FIG. 9.

FIG. 10 is a diagram showing graphically the measured magnetic flux density 38 and magnetic field strength 39 of a magnet 33 obtained based on the analysis described above with reference to FIG. 9. It will be seen that the magnetic flux density 38 increases gently at the portion 34 of the magnet where the magnet thickness decreases gently, and increases sharply at the portion 35 where the magnet thickness decreases sharply, and that the magnetic flux is saturated at a point close to the magnetic pole piece 36 and flows into the surface 37 of the magnetic pole piece 36 with the maximum flux density.

Therefore, by using the magnet of the invention in the stator of the aforesaid capstan motor or the like apparatus, it is possible to obtain a magnetic flux density as high as 16,000 gausses between the magnetic pole piece and armature and to obtain a DC machine of an output torque much larger than that of other DC machines of this type and of the same shape, or conversely it is possible to obtain a DC machine which is much smaller in size than other DC machines of the same capacity.

Figure 11:
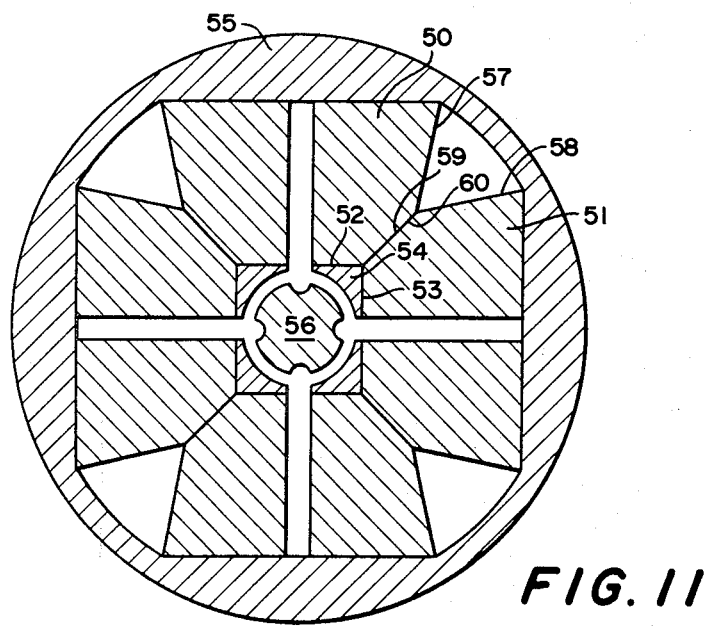
FIG. 11 is a sectional view showing a motor having a stator comprising the magnets shown in FIG. 10.

With reference to FIG. 11, there is shown a DC machine comprising the magnet of the invention. In the embodiment of the stator of the invention shown in FIG. 11, magnets 50 and 51 of the shape shown in FIG. 10 are secured in pairs to two orthogonal flat surfaces 52 and 53 provided on the back side of a magnetic pole 54, respectively, and four stator elements each consisting of the magnets 50, 51 and the magnetic pole piece 54 are disposed radially within a yoke 55 as usual. In the cylindrical space defined by the four magnetic pole pieces 54 is disposed an armature or rotor 56 for rotation therein.

The magnets 50 and 51 respectively have gentle gradient portions 57 and 58, and steep gradient portions 59 and 60 as stated previously. The steep gradient portions 59 and 60 are in contact with each other.

In the assembly shown in FIG. 11, the magnetic flux density and magnetic field intensity are largest at the contacting surfaces of each magnet and the corresponding magnetic pole. Therefore, this assembly is highly adapted for use as capstan motor. It should also be noted that the stator shown in FIG. 11 can be assembled, with the steep gradient portions 59 and 60 of the magnets being in contact with each other, and this is very advantageous in facilitating the assembly in the manufacture of the stator.

Figure 12:
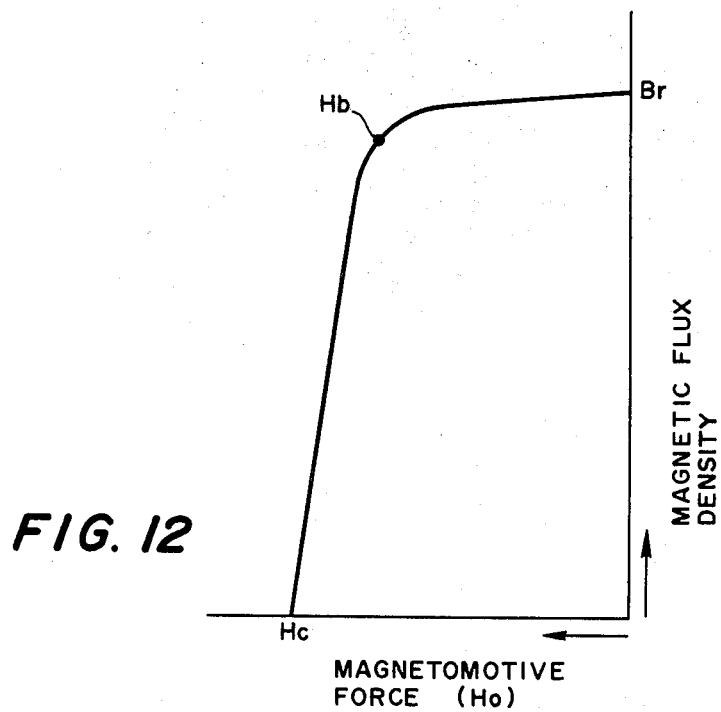
FIG. 12 is a diagram showing the B-H curve of the magnet shown in FIG. 10.

FIG. 12 is a diagram showing the relationship between the magnetomotive force and the magnetic flux density of the magnet shown in FIG. 10. It will be obviously understood from this diagram that the magnet of the invention is highly adapted for use in motor stators.

What is claimed is:

1. A low-inertia DC machine comprising a stator member; and a rotor member concentrically arranged within said stator member so as to define an air gap therebetween; a magnetic stator frame; a magnetic pole piece having an arcuate surface facing said rotor member through the air gap, and first and second flat surfaces extending from respective edges of the arcuate surface and terminating at the crossing line of the said first and second flat surfaces defining an angle of substantially 90 degrees; first and second permanent magnets disposed between said magnet stator frame and said magnetic pole piece to form a magnetic coupling, the outer end surfaces of said first and second permanent magnets, which constitute one magnetic pole, being respectively secured to said magnetic stator frame, the inner end surfaces, which constitute the other magnetic pole, being respectively secured to said first and second flat surfaces of said magnetic pole piece, said first permanent magnet being formed in such a shape that its side surface opposite to the side surface of said second permanent magnet extends from the pole piece to the stator frame to increase gradually the circumferential sectional area of said first permanent magnet as said side surface approaches said outer end, and said second permanent magnet being formed in such a shape that its side surface opposite to the side surface of said first permanent magnet extends from the pole piece to the stator frame to increase gradually the circumferentially sectional area as said side surface of the second magnet approaches the outer end.

2. A low-inertia DC machine according to claim 1 wherein the side surfaces of said first and second permanent magnets opposing each other contact with each other at the portions adjacent said inner end surfaces.

3. A low-inertia DC machine comprising a stator member and a rotor member concentrically arranged within said stator member so as to define an air gap therebetween, said stator member including a plurality of magnetic pole pieces arranged circumferentially at equal intervals and bordering said air gap, each of said magnetic pole pieces having an arcuate surface facing said rotor member through said air gap, first and second flat surfaces which extend from the opposite ends of said arcuate surface and terminate at the crossing line of the first and second flat surfaces defining an angle of 90 degrees; horse-shoe type permanent magnets of the same number as that of the magnetic pole piece, each of which has first and second legs, the end surface of said first leg which constitutes one magnetic pole being secured to said first flat surface of one magnetic pole piece and the end surface of said second leg which constitutes the other magnetic pole being secured to said second flat surface of the other magnetic pole piece adjacent to said one magnetic pole piece, each leg of said horse-shoe type permanent magnets being formed in such a shape that the circumferentially sectional area of said leg increases gradually as said side surface approaches the connecting portion of said first and second legs.

* * * * *